G. W. ROBERTS.
VALVE.
APPLICATION FILED JULY 29, 1911.
1,044,422.
Patented Nov. 12, 1912.
2 SHEETS—SHEET 1.
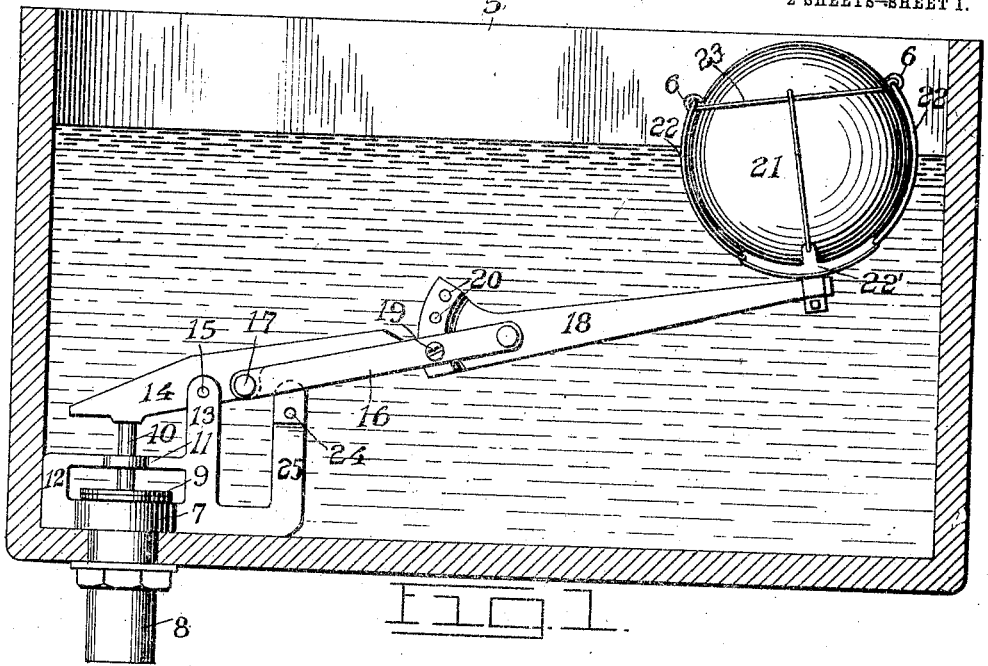
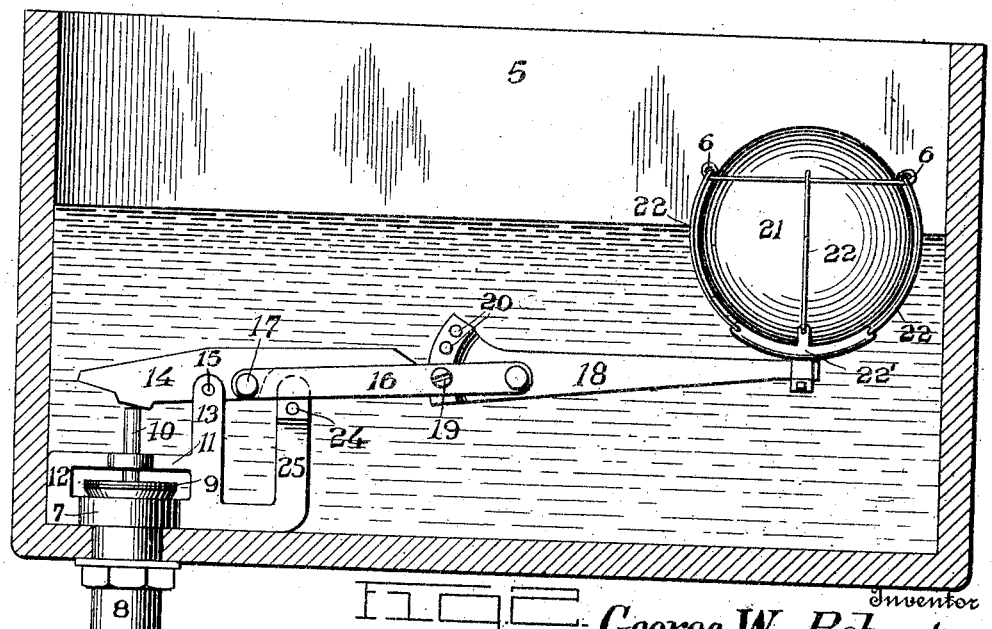
Witnesses
Inventor
George W. Roberts
By Victor J. Evans
Attorney

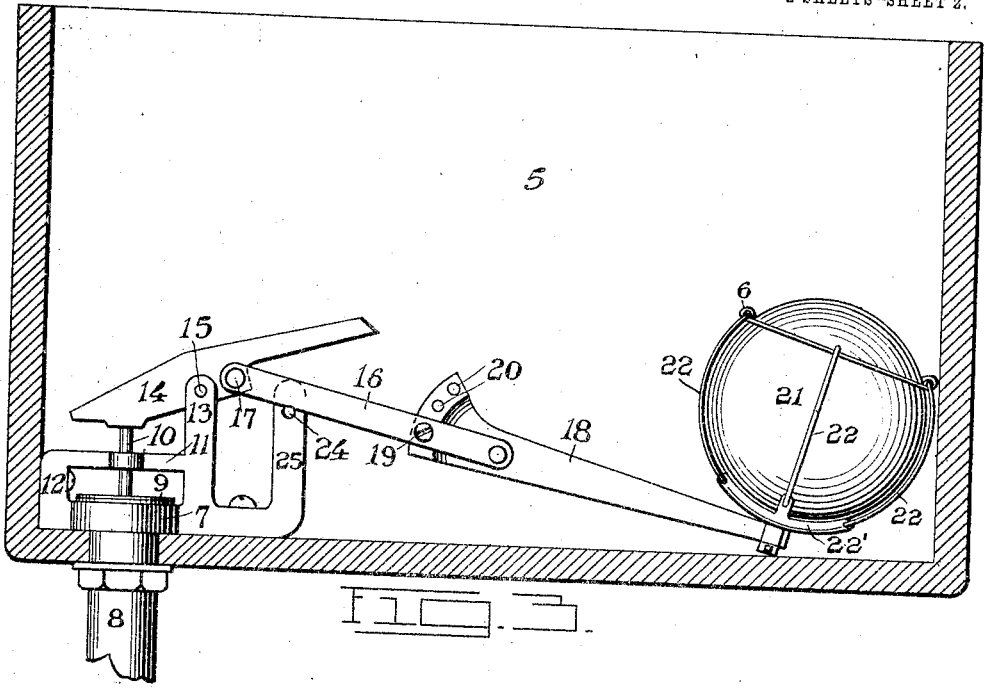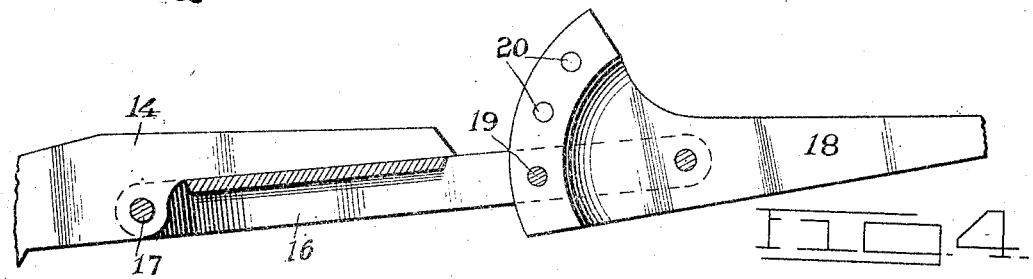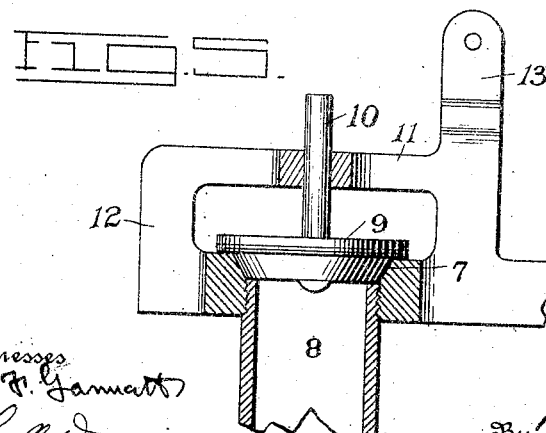

UNITED STATES PATENT OFFICE.

GEORGE W. ROBERTS, OF MENARD, TEXAS.

VALVE.

1,044,422.

Specification of Letters Patent.   Patented Nov. 12, 1912.

Application filed July 29, 1911.   Serial No. 641,191.

*To all whom it may concern:*

Be it known that I, GEORGE W. ROBERTS, a citizen of the United States, residing at Menard, in the county of Menard and State of Texas, have invented new and useful Improvements in Valves, of which the following is a specification.

The object of the invention is to close a tank valve when the float leaks or becomes detached from its supporting arm, or when the tank leaks.

The above and other objects will appear and be better understood from the following description taken in connection with the accompanying drawings, in which, Figure 1 is a detail vertical section taken through a tank with my improved device applied thereto. Fig. 2 is a view similar to Fig. 1 but showing the position of the parts when the tank is partly empty. Fig. 3 is a view similar to Figs. 1 and 2 but showing the position of the parts when either tank or float is in a leaky condition. Fig. 4 is a side elevation of the float arm partly in section. Fig. 5 is a detail section of the valve and its seat.

In the embodiment shown 5 indicates a form of tank employed for serving water to cattle. The valve seat 7 is arranged at the inner end of the inlet pipe 8 and receives the valve 9. The valve 9 has a stem 10 which slides in a guide 11 supported at one end by an upright 12 and at its opposite end by an upright 13. The section 14 of the float arm is suitably supported such as by a pivot 15 in the upper end of the upright 13 and has one end adapted to bear on the upper end of the stem 10. The section 16 of the float arm is connected to the section 14 in any preferred manner such as by a pivot 17 extending through one end of the section 16 and through the section 14.

The section 18 of the float arm has one end extending into a recess at the opposite end of the section 16, the said end of the section 18 being adjustably secured to the section 16 in any preferred manner such as by a pin 19, which extends through the recessed end of the section 16 and is insertible into any of a plurality of openings 20 formed in the section 18. The float 21 is secured to the free end of the section 18 in any suitable manner, such as by a spider 22′ which forms a seat for the float and the arms 22 connected to the limbs of the spider and extending to the upper segment of the float where they are provided with eyes 6 which receive a wire 23 which embraces the float and contacts therewith, such as by twisting its ends one around the other.

Assuming that the tank is partly filled with water, as shown in Fig. 1, it will be seen that as the water is taken from the tank, the float and its arm will descend until the section 16 engages with a stop 24 suitably supported such as by the upright 25 and arranged so as to contact with the section 16 when the water level is adjacent to the bottom of the tank. When the water descends in the tank and the float arm moves downwardly as just described, water pressure on the valve 9 will raise the latter, whereby, water will flow into the tank. The water flowing into the tank will raise the float and float arm as usual whereupon, the section 14 will move the valve downwardly in the guide 11 and into its seat 7 by the time that the desired amount of water flows into the tank. It will be seen that by adjusting the section 18 with respect to the section 16 that the closing of the valve 9 may be advanced or retarded so that the tank may hold any desired quantity of water.

In the event of the float's leaking or becoming detached from the arm or the tank's leaking in the bottom thereof, the float or outer end of the float arm will move downwardly and beyond the stop 24 and in so doing, will turn on the stop 24 as a fulcrum moving the section 14 relatively thereto and forcing the valve 9 into its seat, thus cutting off the supply of water to the tank.

Referring to the drawing it will be seen that the inner end portion of the section 14 normally bears on the section 16 so that when the last named section moves upwardly, the sections 14 and 16 will move as a unit. This unitary movement of the parts will also take place when the sections 14 and 16 move downwardly, since the water will force the stem into contact with the section 14, whereby, the inner end portion thereof will be held in contact with the section 16 until the level of the water is below a point in the tank near the bottom, whereupon the weight of the float and the sections 16 and 18 will operate the section 14 to close the valve as before described.

Although I have shown and described one form of my device it is to be understood that I am not to be limited to the structure shown and described, since various changes may be made within the scope of the appended claims without departing from the spirit or sacrificing any of the advantages of the invention.

What I claim as new is:

1. In a tank valve, the combination with a vertically moving valve proper; of a float arm arranged for limited movement in opposite directions and adapted to lower said valve as it approaches either limit of its movement.

2. In a tank valve, the combination with a vertically moving valve proper; of a swinging float arm adapted to lower said valve when it approaches either end of its arc of movement.

3. In a tank valve, the combination with a vertically moving valve proper; of a swinging float arm adapted to lower said valve when it approaches one end of its arc of movement and to permit said valve to rise during its initial movement in a direction toward the opposite end of said arc and to lower said valve during its final movement toward the last-named end of said arc.

4. In a tank valve, the combination with a vertically moving valve proper; of a movable float arm adapted to operate said valve, said arm including a plurality of relatively movable sections, said arm also being adapted to lower said valve when it approaches either end of its arc of movement.

5. In a tank valve, the combination with a tank having a valve controlled inlet, of a bracket mounted in said tank, spaced parallel uprights carried by said brackets, a float arm comprising a plurality of relatively movable sections, one of said sections being connected to one of said uprights for closing said valve inlet, and means carried by the other upright for contacting another of said movable sections when the float is near the bottom of the tank.

In testimony whereof I affix my signature in presence of two witnesses.

GEORGE W. ROBERTS.

Witnesses:
J. D. SMITH,
E. L. ALLISON.